United States Patent
Kaku

(10) Patent No.: US 6,279,097 B1
(45) Date of Patent: *Aug. 21, 2001

(54) METHOD AND APPARATUS FOR ADAPTIVE ADDRESS LOOKUP TABLE GENERATOR FOR NETWORKING APPLICATION

(75) Inventor: Shinkyo Kaku, San Jose, CA (US)

(73) Assignee: Allied Telesyn International Corporation, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,485

(22) Filed: Nov. 20, 1998

(51) Int. Cl.$^7$ .................................................... G06F 12/00
(52) U.S. Cl. .......................... 711/216; 711/205; 711/206; 711/207; 370/255
(58) Field of Search .................................. 711/219, 216, 711/202–208, 3; 370/255

(56) References Cited

U.S. PATENT DOCUMENTS

| | | | |
|---|---|---|---|
| 4,215,402 | * 7/1980 | Mitchell et al. | 711/216 |
| 4,373,181 | 2/1983 | Chisholm et al. | 364/200 |
| 4,486,739 | 12/1984 | Franaszek et al. | 340/347 |
| 4,588,987 | 5/1986 | Stephens | 340/525 |
| 4,644,478 | 2/1987 | Stephens et al. | 364/550 |
| 4,644,532 | 2/1987 | George et al. | 370/94 |
| 4,922,503 | 5/1990 | Leone . | |
| 4,965,772 | 10/1990 | Daniel et al. | 364/900 |
| 5,124,982 | 6/1992 | Kaku | 370/85.3 |
| 5,491,687 | 2/1996 | Christensen et al. | 370/17 |
| 5,491,804 | 2/1996 | Heath et al. | 395/275 |
| 5,530,958 | * 6/1996 | Agarwal et al. | 711/3 |
| 5,615,340 | 3/1997 | Dai et al. | 395/200.17 |
| 5,633,858 | * 5/1997 | Chang et al. | 370/255 |
| 5,751,952 | 5/1998 | Dai et al. | 395/200.8 |
| 5,774,480 | 6/1998 | Willy | 371/37.1 |
| 5,781,549 | 7/1998 | Dai | 370/398 |

FOREIGN PATENT DOCUMENTS

| | | |
|---|---|---|
| 0594196 A1 | 7/1994 | (EP) . |
| WO 98/29986 | 7/1998 | (WO) . |

* cited by examiner

*Primary Examiner*—Do Hyun Yoo
*Assistant Examiner*—Nasser Moazzami
(74) *Attorney, Agent, or Firm*—Cooley Godward LLP

(57) ABSTRACT

A method of generating a lookup table includes receiving an input address; generating a compressed address from the input address, the compressed address having fewer bits than the input address; selecting a first set of bits from the compressed address; determining whether a memory location pointed to by the first set of bits in an address lookup table includes an unoccupied memory slot; determining whether the input address matches any address stored in the memory location pointed to by the first set of bits in the address lookup table; and selecting a second set of bits from the compressed address in response to there not being an unoccupied memory slot in the memory location pointed to by the first set of bits and the input address not matching any address stored in the memory location pointed to by the first set of bits. A lookup table generator includes an address compressor, a barrel shifter, and an address lookup table that includes a memory location that is pointed to by the first set of bits. A control state machine is coupled to the barrel shifter and the address lookup table and is configured to shift the barrel shifter so that a second set of bits is selected from the compressed address in response to there not being an unoccupied memory slot in the memory location pointed to by the first set of bits and the input address not matching any address stored in the memory location pointed to by the first set of bits.

15 Claims, 9 Drawing Sheets

METHOD AND APPARATUS FOR ADAPTIVE ADDRESS LOOKUP TABLE GENERATOR FOR NETWORKING APPLICATION

BACKGROUND OF THE INVENTION

1. Field of the Invention

The present invention relates to address lookup tables used in computer networking devices, and more particularly, to a method and apparatus for generating such an address lookup table.

2. Description of the Related Art

Local area networks are used on a regular basis to link together multiples nodes, such as personal computers, workstations, servers, etc., to allow the nodes to share information and resources with each other. For small networks, a simple configuration may be used wherein each of the nodes is coupled directly to the network backbone. For more complicated networks having large numbers of nodes, however, direct coupling becomes highly inefficient. To improve efficiency on the more complicated networks, the method of "segmenting" is often applied.

According to the segmenting method, the various nodes in the network are separated into a plurality of groups known as "segments", with each segment typically comprising a plurality of nodes which communicate regularly with each other. All of the nodes in a segment are usually networked to each other to form a sub-network, and the segment is coupled to the network backbone through a single segment port. By coupling the nodes to the network and to each other in this manner, connectivity with the network backbone is preserved while keeping to a minimum the number of ports actually coupled to the backbone. For even more complicated networks, each segment may be divided into sub-segments, and these sub-segments may be further divided into super sub-segments to create a complex hierarchy. The segmenting principle can be extended to any desired level. Segmenting nodes in this manner has been found to improve network efficiency.

A device which is commonly used in segmenting applications is a bridge. A bridge provides a link between two entities. The coupled entities may be two separate segments or they may be a network and a segment. Currently, a wide variety of bridges are available, with many bridges being general purpose bridges having two sides, each side dealing with a large number of nodes as well as other bridges. A typical bridge comprises a first controller for dealing with a first side of the bridge, and a second controller for dealing with a second side of the bridge. A bridge, however, is just one example of a network device that may be used for interfacing a plurality of nodes to a network. Examples of other such network devices are hubs, switches, routers, gateways, etc.

The various network devices that are used for interfacing a plurality of nodes to a network typically include a plurality of working ports for coupling to the plurality of nodes, an address lookup table for storing the addresses of the working ports, an attachment port for coupling to a network, an incoming packet controller, and an outgoing packet controller. During operation these devices receive an incoming data packet from the network through the attachment port. The packet is passed on to the incoming packet controller. The controller extracts a destination address from the packet and determines whether it matches one of the addresses stored in the address lookup table. The address lookup table includes information indicating the specific port with which each address is associated. If an address match is found, then it is determined that the packet is destined for one of the working ports, and in response, the controller sends the incoming packet to that working port.

The destination address that is extracted from the packet typically comprises a large number of bits, such as for example, 48-bits. Although the entire 48-bit destination addresses and corresponding port information are normally stored as data in the address lookup table, the entire 48-bit destination addresses are normally not used to address, or point to memory locations within, the address lookup table. In other words, the entire 48-bit destination addresses are normally not used to point to the specific memory locations and memory slots within the address lookup table where the destination addresses and corresponding port information are stored. The entire 48-bits are not used to point to memory locations within the address lookup table because this would require an extremely large address lookup table which would make operation impractical.

Instead, memory locations within the address lookup table are addressed, or pointed to, by using less than the entire 48-bits of the destination addresses. By using a smaller number of bits, the size of the address lookup table can be reduced to a more practical size. One method that has been used to address the address lookup table by using less than the entire 48-bits of the destination addresses is to first compress the 48-bit destination addresses to a compressed address having fewer than 48-bits. For example, the 48-bit destination addresses may be compressed to a compressed address having 32-bits. Then, a number of adjacent bits, fewer than all 32-bits, of the compressed address are used to address the address lookup table. For example, the 5 least significant bits of the 32-bit compressed address may be used to address the address lookup table.

Using, for example, the 5 least significant bits of the 32-bit compressed address to address the address lookup table works well once the address lookup table has been generated. This method, however, can cause problems when generating the address lookup table. Specifically, the address lookup table is typically generated during use as data packets are received. When a data packet is received, the 48-bit destination address is extracted, the 32-bit compressed address generated, the 5 least significant bits of the 32-bit compressed address selected, and then the memory location pointed to by the 5 least significant bits is checked to see if it already holds the 48-bit destination address and corresponding port information. If the memory location is unoccupied, the 48-bit destination address is stored therein. If the memory location is already occupied and the contents match the 48-bit destination address, then there is no need to stored the 48-bit destination address because it is already included in the address lookup table. In this manner, the address lookup table is slowly generated.

Problems occur when the memory location pointed to by the 5 least significant bits is already occupied but the contents do not match the 48-bit destination address. This situation can occur because the same 5 least significant bits of the 32-bit compressed address can be generated by two or more different 48-bit destination addresses. In other words, when less than the entire 48-bits of the destination addresses are used to address the address lookup table, two or more different 48-bit destination addresses can end up pointing to the same memory location in the address lookup table. When this occurs a different scheme must be used to address the address lookup table because each 48-bit destination address will not end up pointing to its own memory location within the address lookup table.

Thus, there is a need for a method and apparatus for generating an address lookup table which can adapt and accommodate the scenario where two or more different destination addresses end up pointing to the same memory location in the address lookup table.

BRIEF SUMMARY OF THE INVENTION

The present invention provides a method of generating a lookup table. The method includes receiving an input address; generating a compressed address from the input address, the compressed address having fewer bits than the input address; selecting a first set of bits from the compressed address; determining whether a memory location pointed to by the first set of bits in an address lookup table includes an unoccupied memory slot; determining whether the input address matches any address stored in the memory location pointed to by the first set of bits in the address lookup table; and selecting a second set of bits from the compressed address in response to there not being an unoccupied memory slot in the memory location pointed to by the first set of bits and the input address not matching any address stored in the memory location pointed to by the first set of bits.

The present invention also provides an apparatus including a lookup table generator. The lookup table generator includes an address compressor configured to receive an input address and generate a compressed address having fewer bits than the input address. A barrel shifter is coupled to the address compressor and configured to select a first set of bits from the compressed address. An address lookup table is coupled to the barrel shifter and includes a memory location that is pointed to by the first set of bits. The memory location includes at least one memory slot. A control state machine is coupled to the barrel shifter and the address lookup table and is configured to shift the barrel shifter so that a second set of bits is selected from the compressed address in response to there not being an unoccupied memory slot in the memory location pointed to by the first set of bits and the input address not matching any address stored in the memory location pointed to by the first set of bits.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
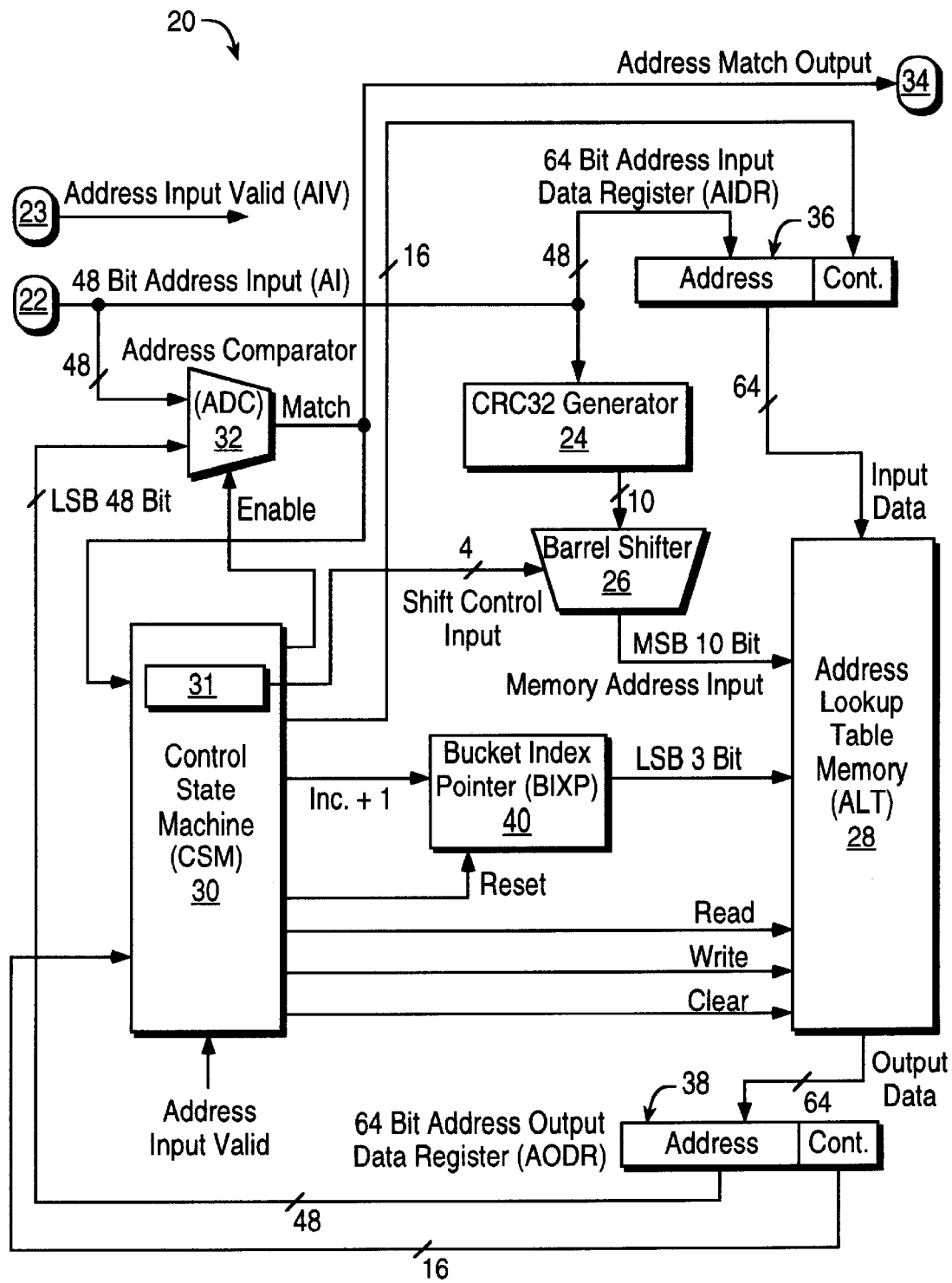
FIG. 1 is a functional block diagram illustrating an adaptive address lookup table generator in accordance with the present invention.

Referring to FIG. 1 there is illustrated an adaptive address lookup table generator 20 in accordance with the present invention. The lookup table generator 20 is particularly useful when it is incorporated into the various network devices discussed above (such as for example a network bridge) that are used for interfacing a plurality of nodes to a network (such as for example a local area network). The lookup table generator 20 may be used in these network devices to generate an address lookup table.

As described above, a device that is used for interfacing a plurality of nodes to a network typically receives an incoming data packet from the network through an attachment port. The packet is passed on to the incoming packet controller that extracts a destination address from the packet. The lookup table generator 20 receives the extracted destination address at the address input node 22. By way of example the extracted destination address that is received at the address input node 22 may be a 48-bit input address.

The lookup table generator 20 includes an address compressor 24 that is configured to receive the input address (i.e., the extracted destination address) from node 22 and generate a compressed address therefrom having fewer bits than the input address. By way of example, the address compressor 24 may be a CRC32 generator which compresses the 48-bit input address to 32-bit data, referred to herein as the compressed address, as well as converting the input address into scattered data.

A barrel shifter 26 is coupled to the output of the address compressor 24. The barrel shifter 26 is configured to select a set of bits from the compressed address generated by the address compressor 24. The set of bits selected from the compressed address is preferably a predetermined number of adjacent bits in the compressed address. The selected set of bits, however, do not necessarily have to be adjacent. Furthermore, in the embodiment shown in FIG. 1, the barrel shifter 26 selects ten bits from the compressed address. It should be well understood that the use of ten bits is just an example and that any number of bits may be selected from the compressed address.

An address lookup table 28 is coupled to the barrel shifter 26. The address lookup table 28 includes memory locations that are addressed, or pointed to, by the set of bits selected from the compressed address by the barrel shifter 26. Specifically, the set of bits selected from the compressed address are used as the access key pointer of the address lookup table 28. As will be discussed in further detail below, the memory locations, also referred to herein as "buckets", in the address lookup table 28 may include one or more than one memory slots.

A control state machine 30 is coupled to the barrel shifter 26 and the address lookup table 28. The control state machine 30 controls the operation of the lookup table generator 20. For example, the control state machine 30 is configured to generate a shift control input to shift the barrel shifter 26 so that a different set of bits is selected from the compressed address by the barrel shifter 26. In general, this shifting is done in response to there not being an unoccupied memory slot in the memory location (of the address lookup table) pointed to by the first set of bits selected by the barrel shifter 26, and, the input address received at node 22 not matching any address stored in the memory location pointed to by the first set of bits.

The control state machine 30 coordinates the determination of whether a memory location pointed to by the first set of bits in an address lookup table includes an unoccupied memory slot, and the determination of whether the input address matches any address stored in the memory location pointed to by the first set of bits in the address lookup table. The determination of unoccupied memory slots will be discussed in detail below. The determination of whether the input address matches stored addresses is facilitated by an address comparator 32. The address comparator 32 compares the input address received at node 22 with the contents of the current memory location and memory slot of the address lookup table 28. The control state machine 30 generates the enable signal for the address comparator 32. When the input address matches one of the contents of the address lookup table 28, the address comparator 32 outputs an address match signal 34 to indicate that the input address has already been registered into the address lookup table 28.

A 64-bit address input data register 36 is coupled to the address input node 22 and the address lookup table 28. The register 36 holds the 48-bit address input and 16-bits of control data. The control data is transferred from the control state machine 30. The content of the register 36 will be stored in the address lookup table 28 when and if it is needed. A 64-bit address output data register 38 is coupled to the address lookup table 28 and the address comparator 32. The register 38 holds a 48-bit address and 16-bits of control data that is read from the address lookup table 28.

The control state machine 30 generates a read signal in order to read data from the address lookup table 28 into the address output data register 38 and a write signal in order to write data from the address input data register 36 into the address lookup table 28. The control state machine 30 generates a clear command signal in order to clear the contents of the address lookup table 28. The control state machine 30 also generates the control data for each input address according to the state and input signals.

The embodiment of the lookup table generator 20 shown in FIG. 1 utilizes a bucket type address lookup table and so it includes a bucket index pointer 40. The bucket type address lookup table and the bucket index pointer 40 are optional features of the present invention. A lookup table generator in accordance with the present invention that does not include a bucket type address lookup table and the bucket index pointer 40 will be discussed below.

The operation of the bucket index pointer 40 is best described with reference to FIG. 2 which illustrates a format which may be used for the address lookup table 28. The address lookup table 28 is divided into a number of memory locations or "buckets". As shown, the buckets are addressed, or pointed to, by the address keys. The address keys correspond to the set of bits selected by the barrel shifter 26. In other words, the ten bits selected by the barrel shifter 26 (from the 32-bits of the compressed address) correspond to the ten most significant bits (MSB) of the access key pointer. By using ten bits for the access key pointer the address lookup table 28 can accommodate 1024 buckets (or memory locations).

Figure 2:
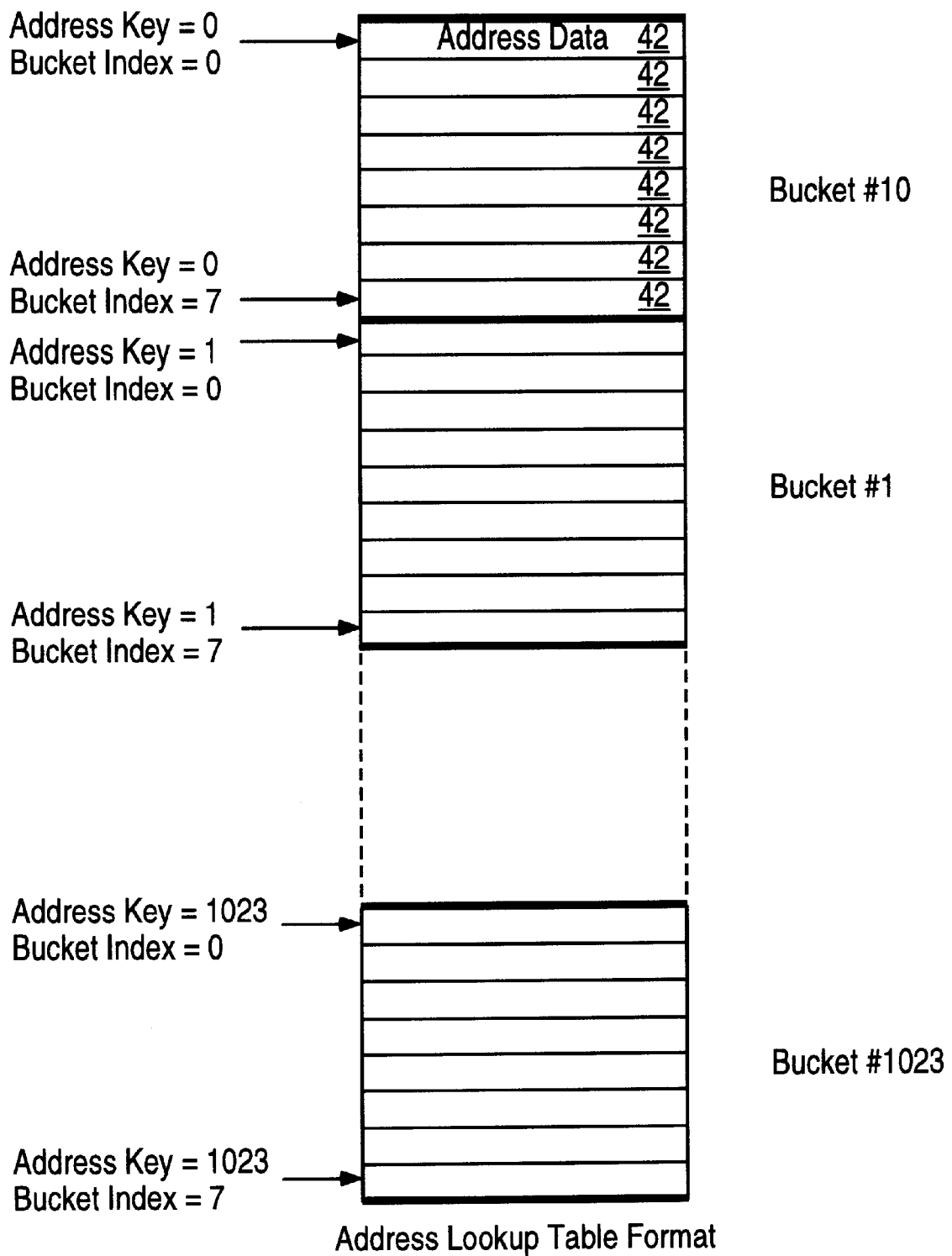
FIG. 2 is a block diagram illustrating the address lookup table format used in the address lookup table shown in FIG. 1.

Each of the buckets (or memory locations) shown in FIG. 2 includes a plurality of memory slots. For example, bucket #0 includes eight memory slots 42 for holding eight different input addresses. Each bucket will normally include the same number of memory slots. For example, as indicated in FIG. 2, each bucket includes eight memory slots. The memory slots of each bucket are addressed, or pointed to, by the bucket index pointer 40. The bucket index pointer 40 will normally include enough bits to support the number of memory slots in each bucket. For example, the bucket index pointer 40 shown in FIG. 1 generates three bits which enables each bucket to support up to eight memory slots. The three bits generated by the bucket index pointer 40 serve as the three least significant bits (LSB) of the access key pointer. Because each bucket includes eight memory slots, the address lookup table can hold up to 8,192 address inputs.

Figure 3:
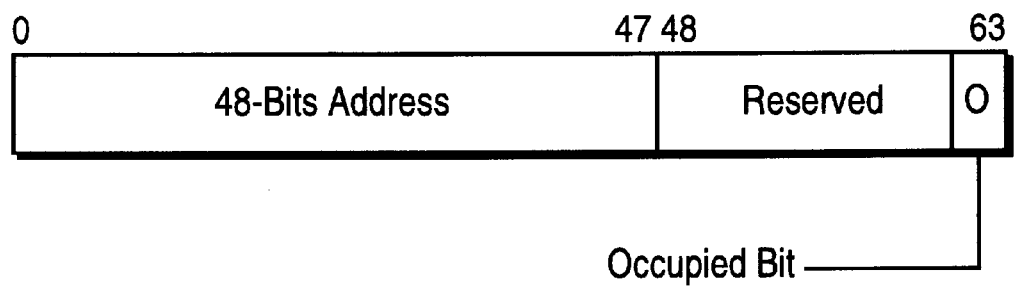
FIG. 3 is a block diagram illustrating in more detail the lookup table data format shown in FIG. 2.

FIG. 3 illustrates an example formatting of the data stored in each of the memory slots shown in FIG. 2. Each of the eight slots hold the original 48-bits of address input with 16-bits control data. Specifically, the 48-bit addresses are stored in bits 0–47, 16-bits of control and port information are stored in bits 48–62, and an occupied bit is stored in bit 63. If the occupied bit is one, the memory slot is already holding an address; if the occupied bit is zero, the memory slot is not holding an address.

As discussed above, problems can occur when a memory slot is already occupied but its contents do not match the current 48-bit input address. This situation can occur because two or more different 48-bit input addresses result in the address compressor 24 generating the same output. When this occurs, the bucket index pointer 40 is incremented by one to the next memory slot, assuming that the bucket index pointer 40 is not yet equal to a maximum value. The control state machine 30 generates an increment signal for the bucket index pointer 40. If the next memory slot is also occupied and its contents do not match the current 48-bit input address, the bucket index pointer 40 is again incremented by one to the next memory slot. This process continues until an unoccupied memory slot in the bucket is found. When an unoccupied memory slot is found, the input address is stored therein.

Figure 4:
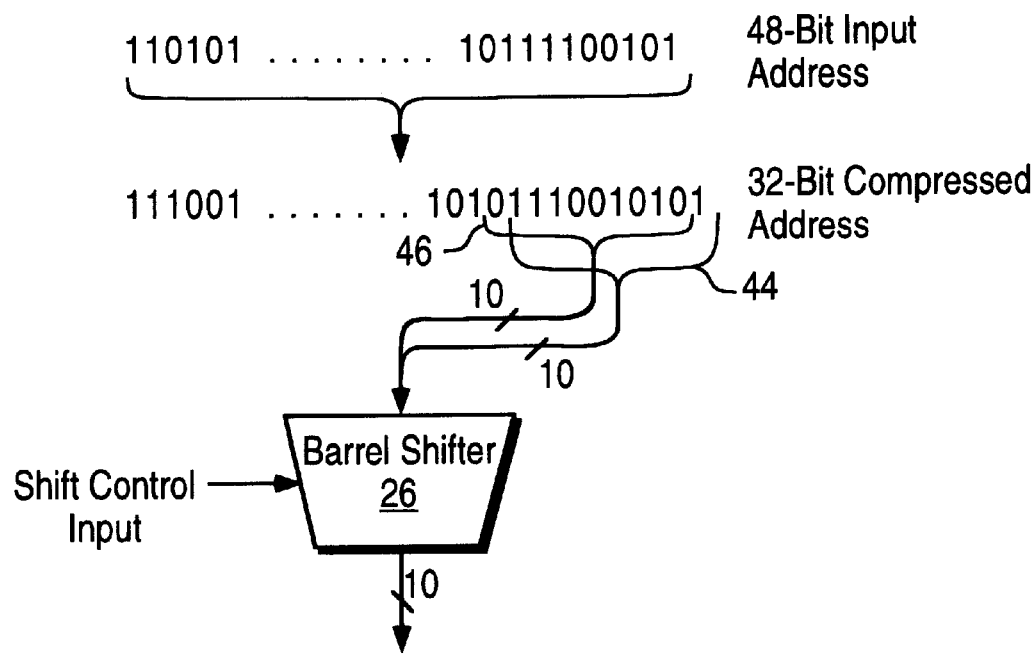
FIG. 4 is a block diagram illustrating the selection of bits by the barrel shifter shown in FIG. 1.

If the bucket does not have an unoccupied memory slot, and none of the addresses stored in the bucket match the current input address, then, in accordance with the present invention, the control state machine 30 shifts the barrel shifter 26 via a shift control input. Referring to FIG. 4, this shifting causes the barrel shifter 26 to select a different set of bits from the output of the address compressor 24. The barrel shifter 26 may be shifted by one bit so that the previous set of bits 44 is shifted by one bit to form the different (new) set of bits 46. It should be understood, however, that the barrel shifter 26 may be shifted by more than one bit in order to select a different set of bits. By selecting a different set of bits from the output of the address compressor 24, each 48-bit input address will ultimately point to a different bucket, or memory location, in the address lookup table 28. The shift control input to the barrel shifter 26 is controlled by the control state machine 30 incrementing a shift control register 31 included in the control state machine 30.

In addition to shifting the barrel shifter 26, the control state machine 30 generates a clear command signal in order to clear all of the contents of the address lookup table 28 so that the lookup table generator 20 can restart the process of generating the lookup table. The control state machine 30 also generates a reset signal to reset the bucket index pointer 40. By continuing to select new sets of bits from the address compressor 24 and clearing the contents of the address lookup table 28, the lookup table generator 20 will eventually find a set of bits in the output of the address compressor 24 that results in each different input address pointing to a different memory slot in the address lookup table 28. In this manner, the barrel shifter 26 will change the bits used for the address keys until the address keys are adapted to all of the different input addresses.

Figure 5A:
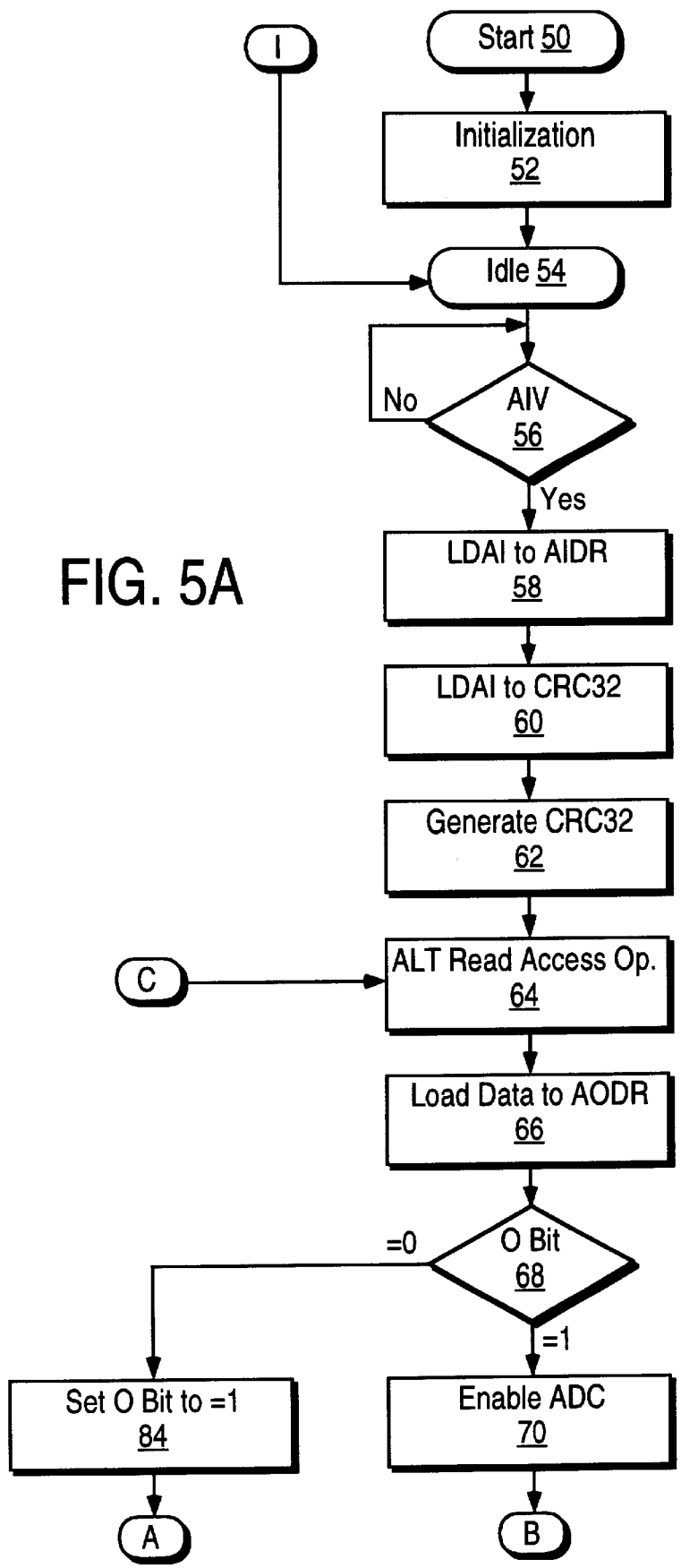
FIGS. 5A, 5B and 5C are flow diagrams illustrating the operation of the control state machine shown in FIG. 1.
Figures 5B, 5C:
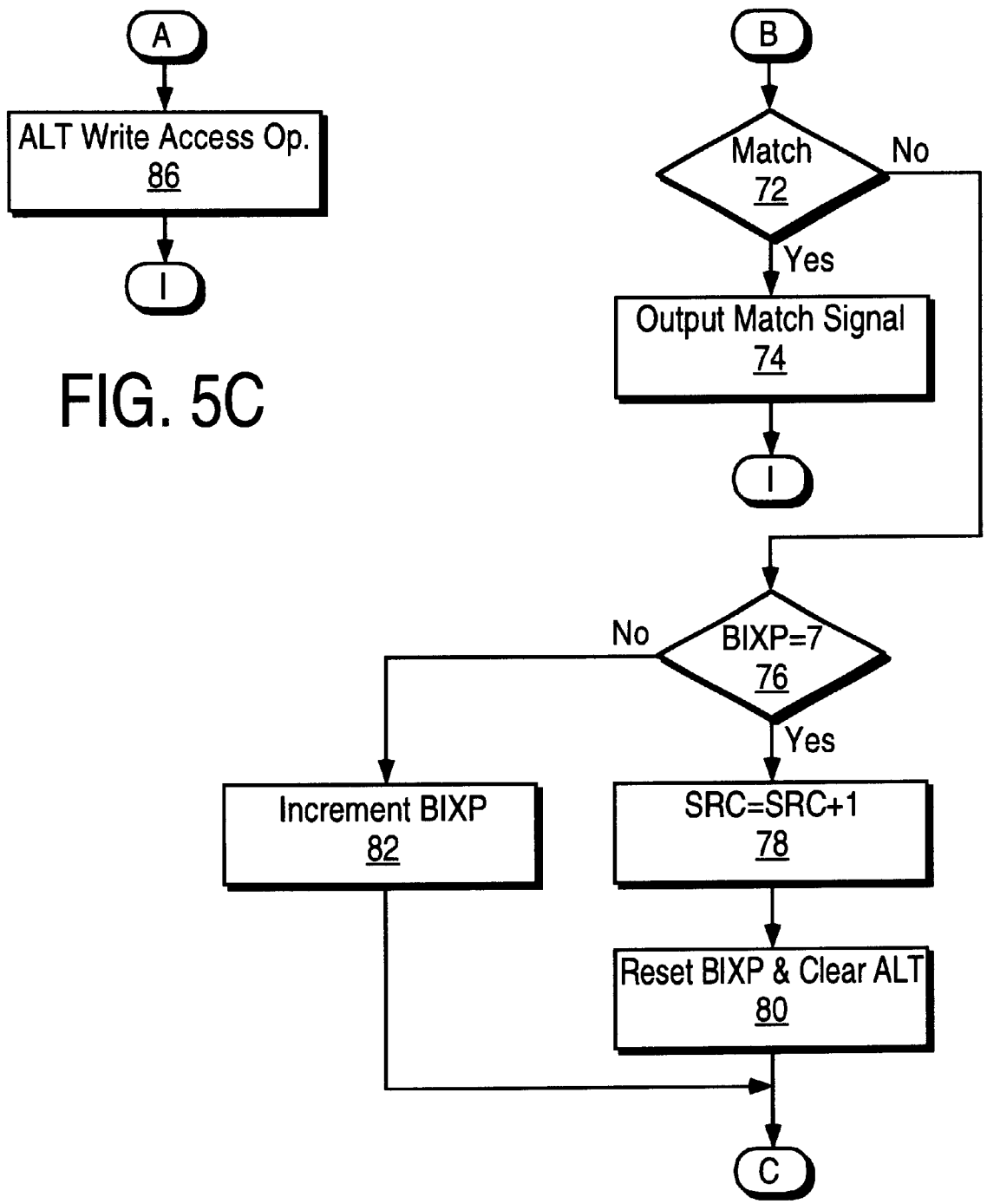

Referring to FIGS. 5A, 5B and 5C, the operation of the control state machine 30 will now be discussed in detail. After the start of operation 50, the control state machine 30 enters the initialization state 52 which clears the entire contents of the address lookup table 28 by activating the clear command signal. The control state machine 30 also resets the bucket index pointer 40, the shift control register 31, and the address compressor 24.

When the initialization state 52 is completed the control state machine moves on to an idle state 54. During the idle state 54, the control state machine 30 waits for the address input valid signal 23. In step 56 the control state machine 30 checks to see if the address input valid signal 23 has been received. When the address input valid signal 23 goes high, the control state machine 30 moves on to state 58.

In state 58 the 48-bit input address is loaded into the address input data register 36, and in state 60 the 48-bit input address is loaded into the address compressor 24. In state 62 the address compressor 24 compresses the 48-bit input address and generates a 32-bit compressed address.

After the compressed address is generated, the control state machine 30 moves on to the address lookup table 28 access state 64. In state 64, the control state machine 30 generates the memory read signal which causes the contents of a memory slot in the address lookup table 28 to be read. The memory slot that is read is in the bucket that is pointed to by the 10-bits (MSB 10) of the output of the address compressor 24 selected by the barrel shifter 26, and the specific memory slot is the one that is pointed to by the 3-bits (LSB 3) generated by the bucket index pointer 40. When the read access operation of state 64 is completed, the 64-bits of read data is loaded into the address output data register 38 in state 66.

After loading the read data into the address output data register 38, the control state machine 30 proceeds on to the check occupied bit state 68. In state 68, the control state machine 30 checks the occupied bit of register 38. As shown in FIG. 3, the occupied bit is bit number 63 of register 38. If the occupied bit is equal to one, the control state machine 30 moves on the enable address comparator state 70.

In state 70, the control state machine 30 activates the enable signal for the address comparator 32. In state 72, the address comparator 32 compares the 48-bit input address with the 48-bit address in the address output data register 38 (bits 0–47) that was read from the address lookup table 28. If the input address and the contents of the address output data register 38 match, the address match output signal 34 is activated in state 74 and the control state machine 30 returns to the idle state 54. If the input address and the contents of the address output data register 38 do not match, the control state machine 30 moves to the check bucket index pointer state 76.

In the check bucket index pointer state 76, the control state machine 30 determines whether or not the bucket index pointer 40 has reached its maximum value, which in this example, is seven. If the bucket index pointer 40 is equal to seven, that particular bucket (or memory location) is full. The bucket is full because there are only eight memory slots in the bucket. This condition indicates that more than eight different input addresses have caused the same compressed address to be generated at the output of the address compressor 24, resulting in the 10-bits selected by the barrel shifter 26 being identical. Thus, more than eight different input addresses end up pointing to the same bucket in the address lookup table 28, and each bucket only has eight memory slots. If this condition occurs, the control state machine 30 moves on to the increment shift control register state 78.

Once state 78 has been entered, there are three steps that are performed before the control state machine 30 can return to the address lookup table access slate 64. First, in state 78 the shift control register 31 is incremented which causes the barrel shifter 26 to be shifted. Shifting the barrel shifter 26 causes a different set of 10-bits to be selected from the output of the address compressor 24, resulting in a different 10 MSB used for addressing the address lookup table. Then, in state 80 the control state machine 30 resets the bucket index pointer 40 and clears all contents of the address lookup table 28 by activating the clear command signal. When these steps have been completed, the control state machine 30 returns to the address lookup table access state 64 to read the first memory slot of the bucket pointed to by the different 10 MSB.

If in state 76, on the other hand, the bucket index pointer 40 is not equal to seven, the bucket index pointer 40 will be incremented in state 82. The control state machine 30 will then return to the address lookup table access state 64 where the memory slot pointed to by the incremented bucket index pointer 40 (of the same bucket) will be read.

Returning to state 68, if the occupied bit is not equal to one, then the occupied bit is set to one in state 84 and the control state machine 30 moves to the address lookup table write access state 86. In state 86, the control state machine 30 outputs the write access signal. During the address lookup table write access operation, the control state machine 30 sets the occupied bit in the address input data register 36 and then stores the contents of the address input data register 36 into the current memory slot of the address lookup table 28. When this is completed, the control state machine 30 returns to the idle state 54.

Figure 6:
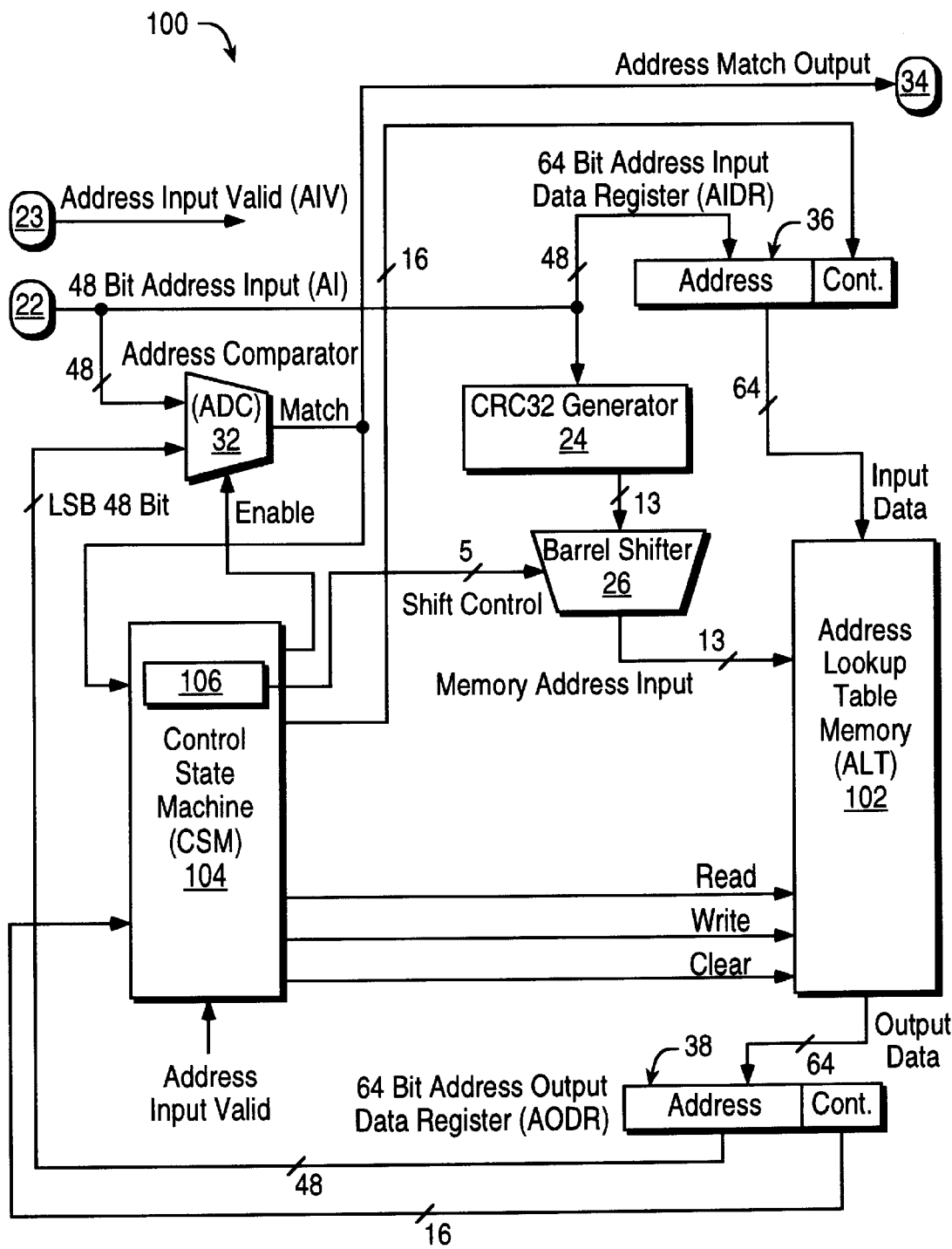
FIG. 6 is a functional block diagram illustrating another adaptive address lookup table generator in accordance with the present invention.

As mentioned above, the present invention also includes a lookup table generator that does not include a bucket type address lookup table and the bucket index pointer 40. Referring to FIG. 6, there is illustrated a lookup table generator 100 in accordance with the present invention that does not include a bucket type address lookup table and the bucket index pointer 40.

The lookup table generator 100 does not use the bucket method. It does include, however, many of the same components having the same function as the lookup table generator 20. For example, the lookup table generator 100 includes the address comparator 32 which compares the 48-bit input address received at node 22 with the contents of the address output data register 38. When the input address matches the contents of the address output data register 38, the address comparator 32 outputs an address match signal 34 to inform the address input that it has already been registered into the address lookup table 102. The lookup table generator 100 also includes the address compressor 24 which compresses the 48-bit input address to a 32-bit compressed address as well as converting the input address into scattered data.

The 64-bit address input data register 36 holds the 48-bit input address with 16-bits of control data. The contents of this register are eventually stored into the address lookup table 102 when needed as described above. The 64-bit address output data register 38 holds 48-bits of address output and 16-bits of control data. The contents of this register are read from the address lookup table 102.

Figure 7:
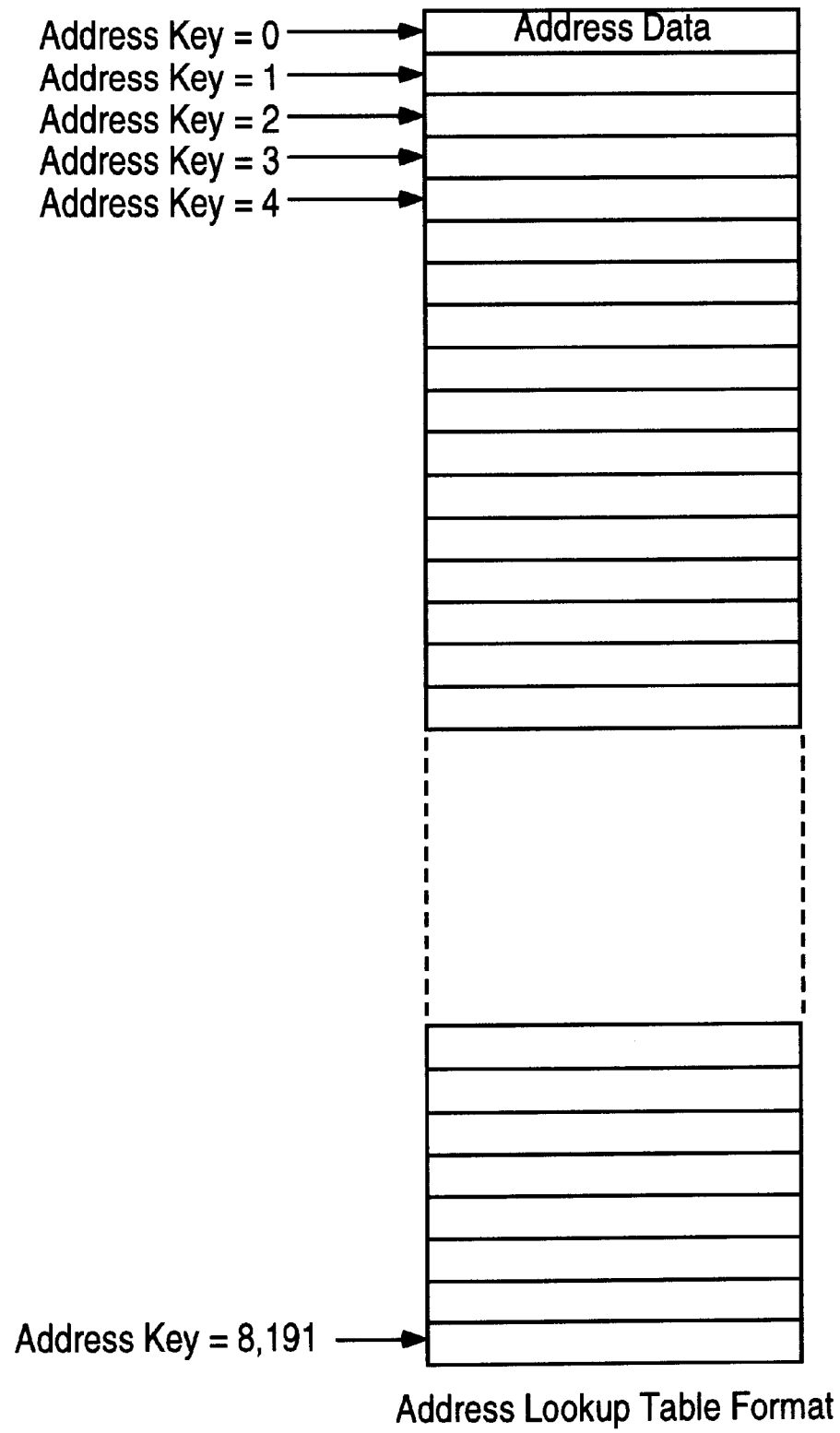
FIG. 7 is a block diagram illustrating the address lookup table format used in the address lookup table shown in FIG. 6.

The lookup table generator 100 uses a linear type address lookup table 102. FIG. 7 illustrates the address lookup table format. A single memory slot is used for each address key, which is different than the address lookup table 28 which provided more than one memory slot for each address key, or bucket. Each memory slot holds the original 48-bit input address with 16-bits of control data.

Because each address key has only a single associated memory slot, the lookup table generator 100 does not need a bucket index pointer to point to memory slots within a bucket. Instead, the single memory slots are addressed, or pointed to, solely by the bits selected by the barrel shifter 26 from the output of the address compressor 24. In order to accommodate the same number of memory slots as the address lookup table 28, the barrel shifter 26 in the lookup table generator 100 selects 13-bits, instead of ten bits, for the access key pointer. The selection of 13-bits out of the 32-bit compressed address provides for 8,192 address keys. This corresponds to 8,192 memory slots, meaning that the address lookup table 102 can hold up to 8,192 address inputs. It should well be understood, however, that any number of bits may be selected from the compressed address by the barrel shifter 26 depending on the number of memory slots that are needed.

The control state machine 104 controls the operation of the lookup table generator 100. The control state machine 104 provides many of the same functions as the control state machine 30 discussed above. For example, the control state machine 104 generates the enable signal for the address comparator 32, the shift control signal for the barrel shifter 26, the read, write, and clear command signals for the address lookup table 102, and the control data for each 48-bit input address according to the state and input signals.

The control state machine 104, however, does operate differently than the control state machine 30 in the sense that the control state machine 104 does not have to control a bucket index pointer. Because of this, if two or more different 48-bit input addresses result in the same compressed address being generated by the address compressor 24, the barrel shifter 26 is immediately shifted to select a different set of 13-bits, in accordance with the present invention, rather than incrementing a bucket index pointer to point to different memory slots within the same bucket. The control state machine 104 also clears all contents of the address lookup table 102 at this time. In other words, the barrel shifter 26 is shifted sooner and the address lookup table is cleared sooner than they would be in the lookup table generator 20. In this manner the barrel shifter 26 is shifted until the address keys are adapted to the different input addresses.

With respect to the detailed operation of the control state machine 104, the operation up to the point at which the address comparator 32 is enabled is largely the same as shown in FIG. 5A, with the exception of the address lookup table access state 64. In state 64, the control state machine 104 generates the memory read signal which causes the contents of a memory slot in the address lookup table 102 to be read. The memory slot that is read is the single memory slot that is pointed to by the 13-bits of the output of the address compressor 24 selected by the barrel shifter 26. A bucket index pointer is not used as with the lookup table generator 20. When the read access operation of state 64 is completed, the 64-bits of read data is loaded into the address output data register 38 in state 66.

Similarly, the address lookup table write access state 86 shown in FIG. 5C is largely the same for the lookup table generator 100, except that the data is written into the single memory slot pointed to by the 13-bits selected by the barrel shifter 26. Specifically, in state 86, the control state machine 104 outputs the write access signal. During the address lookup table write access operation, the control state machine 104 sets the occupied bit in the address input data register 36 and then stores the contents of the address input data register 36 into the single memory slot of the address lookup table 102 pointed to by the 13-bits selected by the barrel shifter 26.

Figure 8:
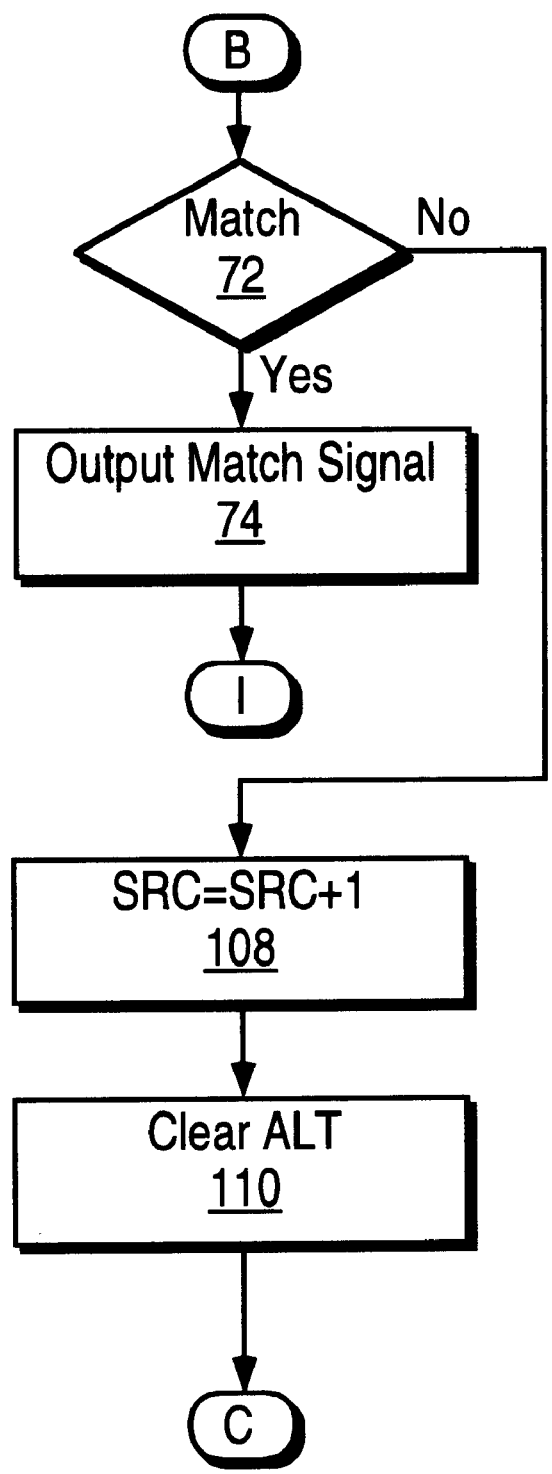
FIG. 8 is a flow diagram illustrating part of the operation of the control state machine shown in FIG. 6.

One difference between the operation of the control state machine 104 and the operation of the control state machine 30 is with respect to the lack of a bucket index pointer in the control state machine 104. Thus, the part of the operation illustrated by FIG. 5B is somewhat modified for the control state machine 104 and is shown in FIG. 8. Referring to FIG. 8, states 72 and 74 are basically the same. In other words, the address comparator 32 compares the 48-bit input address with the 48-bit address in the address output data register 38 (bits 0–47) that was read from the address lookup table 102. If the input address and the contents of the address output data register 38 match, the address match output signal 34 is activated in state 74 and the control state machine 104 returns to the idle state 54.

The difference with the operation of the control state machine 104, however, is what happens if the input address and the contents of the address output data register 38 do not match. Instead of moving on to a check bucket index pointer match state, the control state machine 104 moves directly to the increment shift control register state 108.

Once state 108 has been entered, there are two steps, versus three steps as described above with respect to the control state machine 30, that are performed before the control state machine 104 can return to the address lookup table access state 64. First, in state 108 the shift control register 106 is incremented which causes the barrel shifter 26 to be shifted. Shifting the barrel shifter 26 causes a different set of 13-bits to be selected from the output of the address compressor 24, resulting in a different 13-bits being used for addressing the address lookup table 102. Then, in state 110 the control state machine 104 clears all contents of the address lookup table 102 by activating the clear command signal. When these steps have been completed, the control state machine 104 returns to the address lookup table access state 64 to read the single memory slot pointed to by the different 13-bits. Note that state 110 does not include resetting a bucket index pointer because the lookup table generator 100 does not include a bucket index pointer.

Figure 9A:
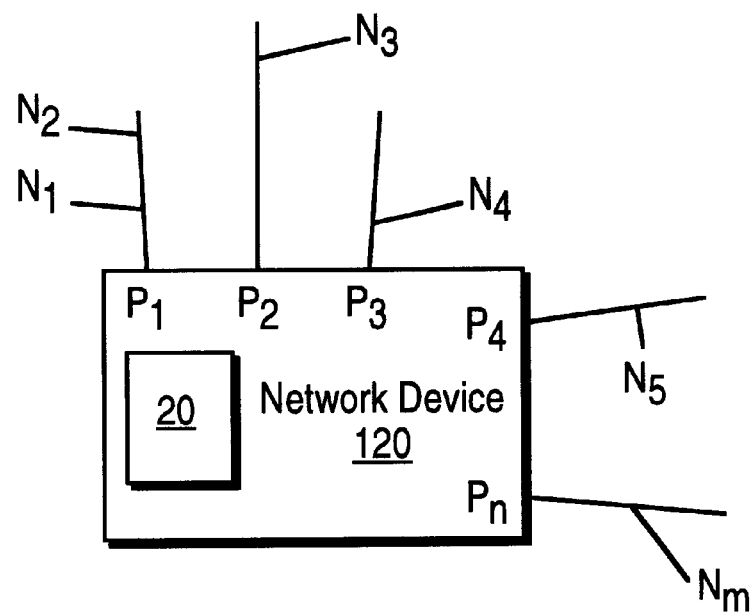
FIGS. 9A and 9B are block diagrams illustrating the adaptive address lookup table generators of FIGS. 1 and 6 being incorporated into network devices.
Figure 9B:
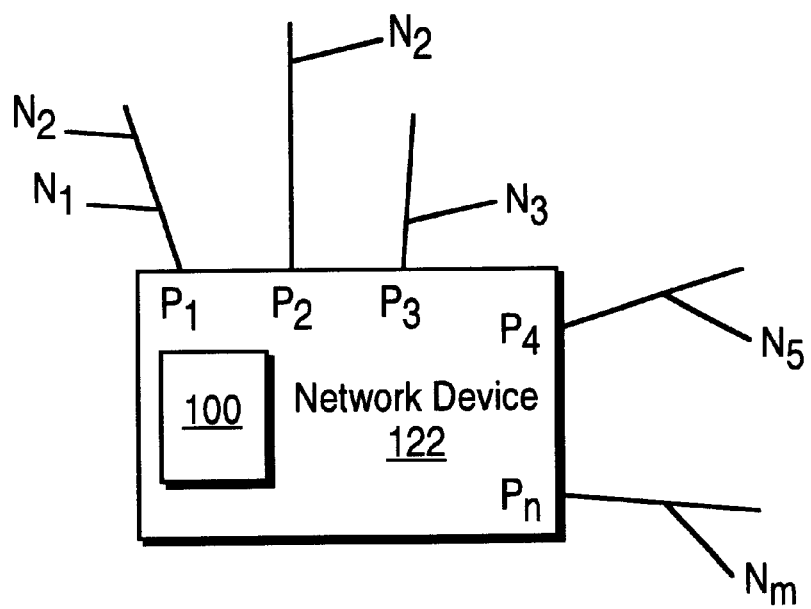

Referring to FIGS. 9A and 9B, the lookup table generators 20 and 100 may be incorporated into any network devices 120 and 122, respectively, having several ports P1, P2, . . . Pn and used for interfacing a plurality of nodes N1, N2, . . . Nm to a network. Examples of such network devices 120 and 122 are hubs, switches, routers, gateways, etc.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A method of generating a lookup table, the method comprising:

receiving an input address;

generating a compressed address from the input address, the compressed address having fewer bits than the input address;

selecting a first set of bits from the compressed address;

determining whether a memory location pointed to by the first set of bits in an address lookup table includes an unoccupied memory slot;

determining whether the input address matches any address stored in the memory location pointed to by the first set of bits in the address lookup table; and selecting a second set of bits from the compressed address in response to there not being an unoccupied memory slot in the memory location pointed to by the first set of bits and the input address not matching any address stored in the memory location pointed to by the first set of bits.

2. A method in accordance with claim 1, wherein the step of selecting a first set of bits from the compressed address comprises:

selecting a predetermined number of adjacent bits from the compressed address.

3. A method in accordance with claim 2, wherein the step of selecting a second set of bits from the compressed address comprises:

shifting the predetermined number of adjacent bits by one bit.

4. A method in accordance with claim 1, wherein the memory location pointed to by the first set of bits includes a plurality of memory slots, and wherein the step of determining whether the memory location pointed to by the first set of bits in the address lookup table includes an unoccupied memory slot comprises:

determining whether a first memory slot pointed to by an index pointer is occupied;

incrementing the index pointer by one in response to the first memory slot being occupied, the input address not matching an address stored in the first memory slot, and the index pointer not being equal to a maximum value; and determining whether a second memory slot pointed to by the incremented index pointer is occupied.

5. A method in accordance with claim 4, wherein the step of determining whether the input address matches any address stored in the memory location pointed to by the first set of bits in the address lookup table comprises:

comparing the input address with an address stored in an occupied memory slot.

6. A method in accordance with claim 1, wherein the memory location pointed to by the first set of bits includes one memory slot, and wherein the step of determining whether the memory location pointed to by the first set of bits in an address lookup table includes an unoccupied memory slot comprises determining whether the one memory slot is occupied, and wherein the step of determining whether the input address matches any address stored in the memory location pointed to by the first set of bits in the address lookup table comprises comparing the input address with an address stored in the one memory slot in response to the one memory slot being occupied.

7. A method in accordance with claim 1, further comprising:

clearing all contents of the address lookup table in response to there not being an unoccupied memory slot in the memory location pointed to by the first set of bits and the input address not matching any address stored in the memory location pointed to by the first set of bits.

8. An apparatus including a lookup table generator, the lookup table generator comprising:

an address compressor configured to receive an input address and generate a compressed address having fewer bits than the input address;

a barrel shifter coupled to the address compressor and configured to select a first set of bits from the compressed address;

an address lookup table coupled to the barrel shifter that includes a memory location that is pointed to by the first set of bits, the memory location including at least one memory slot; and a control state machine coupled to the barrel shifter and the address lookup table that is configured to shift the barrel shifter so that a second set of bits is selected from the compressed address in response to there not being an unoccupied memory slot in the memory location pointed to by the first set of bits and the input address not matching any address stored in the memory location pointed to by the first set of bits.

9. An apparatus in accordance with claim 8, wherein the barrel shifter is configured to select the first set of bits from the compressed address by selecting a predetermined number of adjacent bits from the compressed address.

10. An apparatus in accordance with claim 9, wherein the control state machine is configured to shift the barrel shifter so that a second set of bits is selected from the compressed address by shifting the predetermined number of adjacent bits by one bit.

11. An apparatus in accordance with claim 8, wherein the memory location pointed to by the first set of bits includes a plurality of memory slots, and wherein the lookup table generator further comprises:

an index pointer configured to point to one of the plurality of memory slots.

12. An apparatus in accordance with claim 11, wherein the control state machine is further configured to determine whether there is an unoccupied memory slot in the memory location pointed to by the first set of bits by:

determining whether a first memory slot pointed to by the index pointer is occupied;

incrementing the index pointer by one in response to the first memory slot being occupied, the input address not matching an address stored in the first memory slot, and the index pointer not being equal to a maximum value; and determining whether a second memory slot pointed to by the incremented index pointer is occupied.

13. An apparatus in accordance with claim 12, wherein the lookup table generator further comprises:

a comparator coupled to receive the input address and addresses stored in the address lookup table;

wherein the control state machine is further configured to determine whether the input address matches any address stored in the memory location pointed to by the first set of bits by enabling the comparator to compare the input address with an address stored in an occupied memory slot.

14. An apparatus in accordance with claim 8, wherein the control state machine is further configured to clear all contents of the address lookup table in response to there not being an unoccupied memory slot in the memory location pointed to by the first set of bits and the input address not matching any address stored in the memory location pointed to by the first set of bits.

15. An apparatus in accordance with claim 8, wherein the apparatus comprises a network device having a plurality of ports and used for interfacing a plurality of nodes to a network.

* * * * *